United States Patent [19]

Burckhardt et al.

[11] 3,744,851

[45] July 10, 1973

[54] BRAKE FORCE REGULATING SYSTEM FOR VEHICLES, ESPECIALLY FOR MOTOR VEHICLES

[75] Inventors: Manfred H. Burckhardt, Waiblingen; Hans-Jorg Florus, Goppingen; Horst Grossner, Geradstetten(Wurtt.); Helmut Krohn, Esslingen-Liebersbronn, all of Germany

[73] Assignee: Daimler-Benz Aktiengesellschaft, Stuttgart-Untertuerkheim, Germany

[22] Filed: July 7, 1970

[21] Appl. No.: 52,833

[30] Foreign Application Priority Data

July 22, 1969 Germany.................. P 19 37 123.4

[52] U.S. Cl. ........... 303/21 BE, 303/20, 303/21 AF
[51] Int. Cl. .............................. B60t 8/08, B60t 8/12
[58] Field of Search........................ 188/181; 303/20, 303/21; 317/5; 318/52; 324/160, 161, 162; 340/262, 263

[56] References Cited
UNITED STATES PATENTS

| | | | |
|---|---|---|---|
| 3,494,671 | 2/1970 | Slavin et al........................ | 303/21 P |
| 3,245,213 | 4/1966 | Thompson et al............... | 303/21 EB |
| 3,556,611 | 1/1971 | Howard........................... | 303/21 AF |
| 3,544,172 | 12/1970 | Howard et al.................. | 303/21 BE |
| 3,275,384 | 9/1966 | Hirzel............................. | 303/21 EB |
| 3,482,887 | 12/1969 | Sheppard........................ | 303/21 BE |
| 3,547,501 | 12/1970 | Harned et al................... | 303/21 BE |
| 3,556,610 | 1/1971 | Leiber............................. | 303/21 P |

*Primary Examiner*—Milton Buchler
*Assistant Examiner*—Stephen G. Kunin
*Attorney*—Craig and Antonelli

[57] ABSTRACT

A brake force control system for vehicles, in particular motor vehicles in which a sensing device is coordinated to each wheel for detecting its rotational speed condition, whose signals influence the brakes when exceeding or dropping below a predetermined threshold value; the sensing devices detect both the wheel slippage and also the acceleration of a wheel and the measuring magnitudes representing slippage and acceleration are combined into a signal magnitude representing the control pulse for the brakes.

32 Claims, 5 Drawing Figures

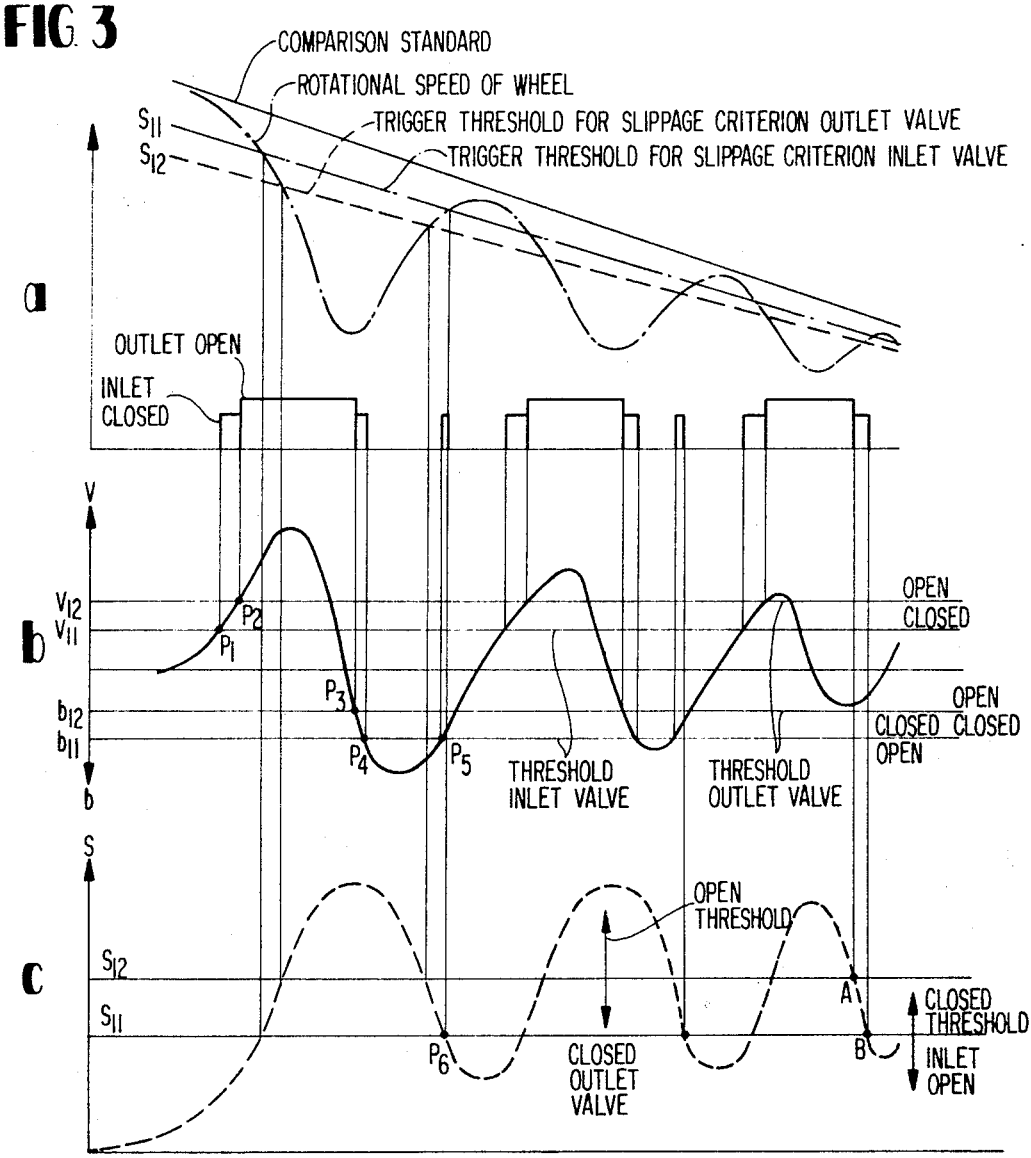

BRAKE FORCE REGULATING SYSTEM FOR VEHICLES, ESPECIALLY FOR MOTOR VEHICLES

The present invention relates to a brake force control system for vehicles, especially for motor vehicles, whereby a sensor is coordinated to each wheel for determining its rotational condition, whose signals, when exceeding or falling below a predetermined threshold value, influence the brakes.

Brake force control systems of the aforementioned type are known. In these systems the purpose is to so control the brake moment that the maximum force adapted to be transmitted between the wheel and the road is utilized. In this manner, in case of emergency braking operations, the shortest brake path is attained. For that purpose, essentially two methods are known in the prior art, and more particularly, one starts with the slippage of the wheel in the first method (slippage control), and with the acceleration of the wheel in the second (acceleration control). Both methods have the disadvantage in common that they function completely satisfactorily only for very certain driving conditions for which the adjustment of the control system was designed. It is not possible by the use of one of the two methods alone to detect and exploit in an optimum manner all occurring load conditions of the vehicle wheel, as, for example, alternating brake force factors, curve velocity, braking in the curve. Therebeyond, the following disadvantages result in particular:

Since the exact comparison wheel rotational speed—vehicle velocity can hardly be realized in practice, one utilizes the expedient in connection with the "slippage regulation" in that one compares the rotational speeds of the individual wheels among each other and utilizes as comparison standard the rotational speed of the wheel rotating fastest. The application of such a brake slippage control is limited:

1. By the response delay of the adjusting and actuating members which can be traced back in general to the limited flow quantity of the brake fluid per unit time on the inside of the adjusting or actuating members;

2. By the brake medium quantity available which limits the number of control cycles; and 3. By the condition of optimum brake slippage dependent on the velocity, of the matching of road to tire, on the surroundings and on the driving condition. This condition of optimum brake slippage fluctuates in such a manner that no generally valid intended value can be predetermined.

For detecting the wheel acceleration one utilizes in connection with the "acceleration regulation" for the most part inert masses, by means of which electric switches are actuated. With such an arrangement, however, accelerations which stem from the drive, for example, shocks and impacts as a result of an uneven road surface as well as the rotary accelerations stemming from changes in the road radius, cannot be utilized. However, they may, nevertheless, cause a response in case the response thresholds have not been selected sufficiently large. However, with the large thresholds required as a result thereof, there exists the danger that a wheel may nonetheless become blocked slowly, i.e., with a deceleration below the response threshold. According to the principle of such prior art systems, a positive acceleration threshold during the pressure decrease initiated by the deceleration signal in the brake circuit is to signal the entry of the wheel into the re-acceleration phase. The pressure decrease is then stopped when attaining this threshold. If now no adequate re-acceleration occurs during the pressure decrease (for example, with a small friction value on ice or in case of aqua-planing), then the signal for the decrease of the pressure is no longer cancelled. The wheel brake is therefore pressureless and does not transmit any longer any brake force during the further braking operation. Such a system does not assure under all driving and road conditions the aimed-at shortest brake path and wheels free from locking.

The present invention is concerned with the task to avoid the aforementioned disadvantages. Consequently, it is the special purpose of the present invention to provide a brake force control system, by means of which the consideration of changing conditions is at least approximately possible.

The underlying problems are solved according to the present invention in that with the brake force regulation systems of the aforementioned types, sensing devices are utilized by means of which both the brake slippage as also the wheel acceleration can be detected and in that the two measuring magnitudes representing the slippage and the acceleration, respectively, are combined into a signal magnitude representing the control pulse for the brakes. One thereby understands by the term "wheel slippage" the deviation of the wheel rotational speed from a comparison standard whereby in the instant case the rotational speed of the wheel rotating fastest is utilized for that purpose. The arrangement is thereby made in that case in such a manner that according to a further proposal of the present invention, the measuring magnitude derived from the sensing device and proportional to the rotational speeds serves, on the one hand, for the formation of the measuring magnitude representing the slippage by a comparison with a comparison standard and, on the other, for the formation of the measuring magnitude representing the acceleration by differentiation.

The term "combination" or "connection" of the signals is to be understood in the present invention as any possible electronic connection or combination of the two measuring magnitudes. Thus, it is, for example, possible to combine the two measuring magnitudes—for the most part, they are voltages—additively into a third magnitude and to utilize the same as signal magnitude for the control of the brakes. However, the present invention prefers a solution according to which the two measuring magnitudes representing the slippage and the acceleration are adapted to be compared separately with the threshold value and only the result is subsequently combined into the signal magnitude. As sensing devices for the measuring magnitudes may be used, inter alia, tacho-generators which may be constructed, for example, as D.C. generators or also as A. C. generators with following rectification. However, in contradistinction thereto, the present invention prefers a solution according to which a frequency generator is arranged at each wheel as sensing device or is operatively and drivingly connected with the wheel.

The described disadvantages can be avoided by the present invention. It results in particular in a higher response sensitivity, and it is therefore attained by the present invention that in case of a slow decrease of the wheel rotational speed (weak acceleration signals), the control is actuated by the slippage signal and thus a locking of the wheel is prevented in every case. Furthermore, it is not longer necessary to attain a predetermined re-acceleration value in order to terminate the pressure decrease in the brake cylinder.

A further feature of the present invention resides in that a frequency voltage converter is coordinated to each frequency generator, and in that the frequency voltage converters are combined, on the one hand, by way of diodes at one point for the formation of the maximum voltage (comparison standard) and, on the other, in by-passing the maximum voltage point, are connected with differentiators. It further proposed thereby further proposed according to the present invention that the maximum voltage prevailing at the maximum voltage point is divided in the ratio of the desired response condition by resistances and the partial voltage is adapted to be fed to a differential amplifier constructed as threshold switch or circuit.

According to a further feature of the present invention, each differentiator feeds with its output two parallel frequency valuation or weighting members, each of which is operatively connected, in its turn, with a differential amplifier constructed as threshold circuit. It is thereby essential and advantageous that the frequency valuation or weighting for the deceleration and acceleration takes place in a different manner, i.e., the corresponding weighting members are constructed differently. In case no different valuation or weighting is necessary, one weighting element for each differentiator is sufficient.

It is further proposed by the present invention that one threshold circuit each, for example, a differential amplifier for slippage, acceleration and deceleration, is coordinated to each actuating member present in the brake circuit, and the output signals of these three differential amplifiers are connected by a logic circuit in a manner according to a logic table. It should be mentioned in this connection that separate valves for the inlet and outlet may be present in the brake circuit which are then also to be controlled separately, i.e., each by means of the aforementioned three differential amplifiers. Other possibilities reside in the use, for example, of shifting valves, for which naturally no separate control is then necessary. The formal logic table is so laid out that a control pulse is initiated only in the presence of a deceleration or slippage signal or in case of both of these signals but is not initiated in all other conditions. With a separate control of the inlet and outlet valves, this logic table is, in principle, similar for both valves, only the threshold values are different.

In one embodiment according to the present invention, the logic circuit is constructed of integrated control circuits and essentially consists for each actuating or adjusting member of a NOR-element with three inputs and of a NOR-element with two inputs. The arrangement is then made according to the present invention in such a manner that the output of each threshold circuit, for example, of each differential amplifier, is connected with one respective input of the NOR-element with three inputs, whose output is connected with one input of the NOR-element having two inputs, whose second input is then connected with the differential amplifier representing the acceleration.

Accordingly, it is an object of the present invention to provide a brake force control system for vehicles, especially for motor vehicles, which avoids by simple means the aforementioned shortcomings and drawbacks encountered in the prior art.

Another object of the present invention resides in a brake-force control system for motor vehicles which operates satisfactorily under substantially all driving conditions, taking into due consideration all occurring load conditions of the vehicle.

A further object of the present invention resides in a brake force control system for vehicles which is characterized by higher response sensitivity and which permits control by the slippage signal in case of a slow decrease of the wheel rotational speed.

Still a further object of the present invention resides in a brake force control system of the aforementioned type which assures an operation of the brake system that precludes locking of any wheel.

These and other objects, features, and advantages of the present invention will become more obvious from the following description when taken in connection with the accompanying drawing which shows, for purposes of illustration only, one embodiment in accordance with the present invention, and wherein:

FIG. 2 is a logical table representing the operation and functioning of the present invention; and FIGS. 3a, 3b and 3c are diagrams representing the curves of different measuring magnitudes explanatory of the operation of the present invention.

Figure 1:
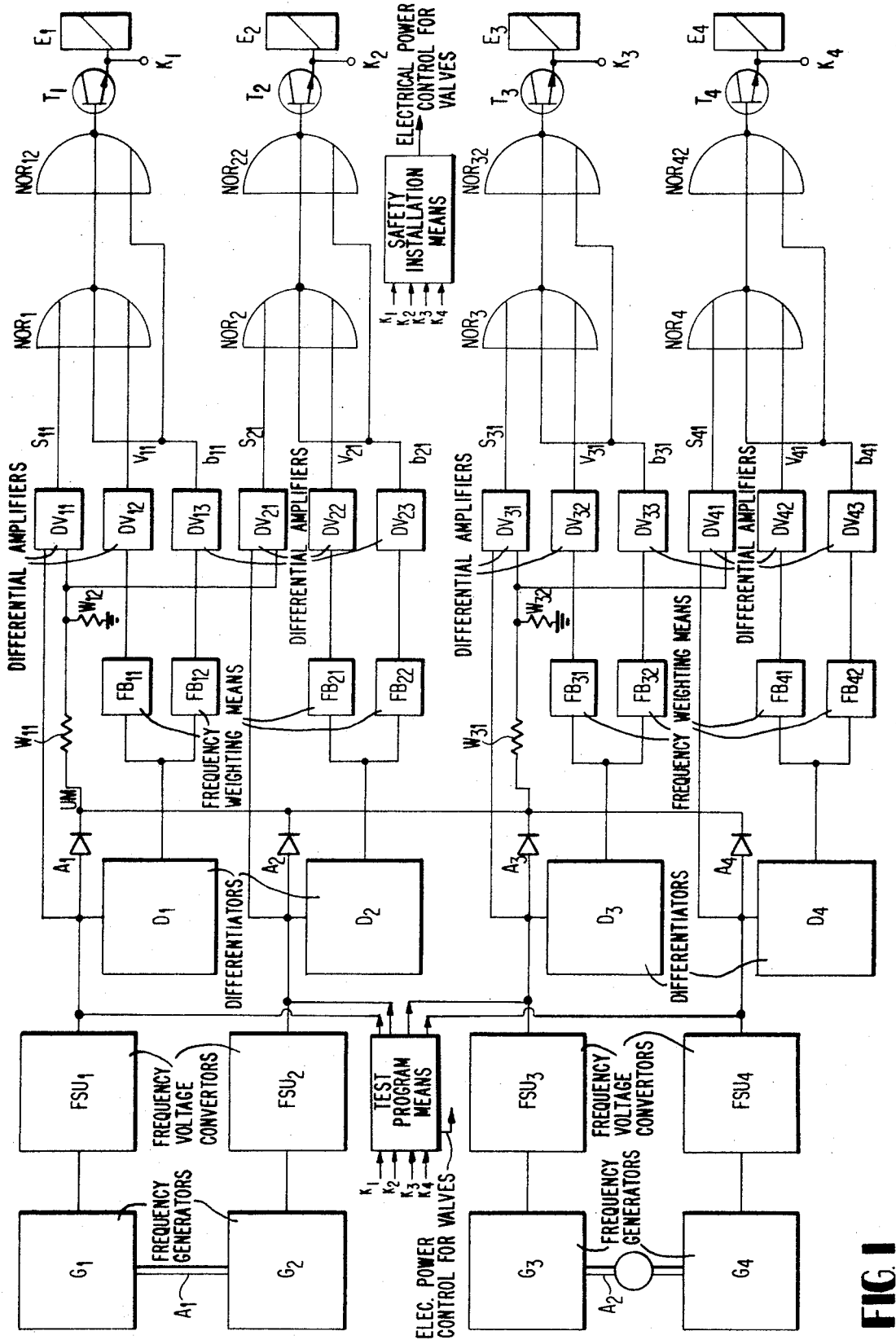
FIG. 1 is a schematic block diagram of a brake force control system in accordance with the present invention in which only the control of the inlet valves has been shown for the sake of clarity.

The slippage of a wheel with respect to the remaining wheels indicates the locking tendency of this wheel. Consequently, exceeding certain threshold values of the slippage characterizes the wheel condition. It is therefore not necessary to detect the instantaneous value of the slippage but an indication concerning the reaching of this threshold value suffices.

For purposes of obtaining this threshold value of the slippage a comparison has to be carried out. For this purpose, it is necessary to obtain at first a rotational speed-proportional voltage for each wheel. Consequently, referring to FIG. 1, one frequency generator $G_1$ to $G_4$ is coordinated to a respective one of the four wheels. These generators are in principle multi-pole A. C. generators with a very large number of poles in which not the amplitude of the produced voltage but the frequency thereof represents the rotational speed information. The further processing of the pulses derived from the transmitter is realized in the conventional-frequency voltage converters $FSU_1$ to $FSU_4$.

According to FIG. 1, the rotational speed signals available at the output of the frequency voltage converters $FSU_1$ to $FSU_4$ are connected together by way of diodes $A_1$ to $A_4$ to a common point UM for producing a maximum voltage. The voltage at this point UM is therefore determined by the wheel rotating fastest. This maximum voltage forms the comparison voltage for the slippage of each wheel. It is divided in the desired response rotational speed ratio by the resistances $W_{11}$, $W_{12}$ and $W_{31}$, $W_{32}$ and is fed to the input of the differential amplifiers $DV_{11}$, $DV_{21}$, $DV_{31}$ and $DV_{41}$. The response condition can be selected differentially for each axle in order to take into consideration the differences in the axle load distribution.

Additionally, the rotational speed signal is fed in by-passing relationship to the aforementioned diodes and the maximum voltage point UM, to the second input of a respective differential amplifier $DV_{11}$ to $DV_{41}$. These differential amplifiers of any conventional construction serve as comparators and are constructed as threshold circuits of conventional type. One obtains in the output of such a differential amplifier a signal when the respective wheel has reached a slippage value with respect to the wheel rotating fastest (comparison standard), that is defined by the resistance ratio $W_{12}/(W_{11}+W_{12})$ and $W_{32}/(W_{31}+W_{32})$, respectively. This signal in the output of the differential amplifier is a logical yes/no signal. Insofar as the outlet valves (not shown) are to be controlled separately, the same installation with another threshold value is present once more.

The acceleration of the wheel can be obtained from the rotational speed proportional voltage in the output of the frequency voltage converter by an electrical differentiation. For this purpose, the frequency voltage converters $FSU_1$ to $FSU_4$ are connected with the differentiators $D_1$ to $D_4$ of conventional construction in bypassing relationship to the maximum voltage point UM. The signal available in the output thereof, however, is not yet suitable for further transmission since high frequency rotational speed changes are present not only during the brake slippage. However, they should not be used for the signal transmission. Consequently, a frequency valuation or weighting has to be introduced in such a manner that:

1. The high frequency component in the acceleration operation is of little influence on the control system; and
2. Only a predetermined acceleration progress permits a signal preparation.

For this purpose, the differentiators $D_1$ to $D_4$ are connected with two frequency weighting elements $FB_{11}$ and $FB_{12}$, $FB_{21}$ and $FB_{22}$, $FB_{31}$ and $FB_{32}$ and $FB_{41}$ and $FB_{42}$, respectively, which are of any conventional construction. These elements $FB_{11}$ to $FB_{41}$ serve the weighting of the deceleration and the elements $FB_{12}$ to $FB_{42}$ the weighting of the acceleration. In order that these weighting operations can be realized from differing points of view, the weighting elements are constructed differently. The outputs of these frequency valuation or weighting elements $FB_{11}$ or $FB_{12}$ to $FB_{41}$ and $FB_{42}$ are connected with corresponding differential amplifiers $DV_{12}$ and $DV_{13}$ to $DV_{42}$ and $DV_{43}$, respectively. In the output of each differential amplifier $DV_{12}$ to $DV_{42}$ serving as threshold circuits is provided a logical yes/no signal for the deceleration, and in the output of each differential amplifier $DV_{13}$ to $DV_{43}$ a logical yes/no signal for the acceleration.

Thus, three logic signals are available for the control of the adjusting or actuating members, for example, of the inlet valves $E_1$ to $E_4$; namely, the slippage $s_{11}$ to $s_{41}$, the deceleration $v_{11}$ to $v_{41}$ and the accelerations $b_{11}$ and $b_{41}$. These signals are now combined by a logic circuit taking into consideration certain points of view. In FIG. 2, the logic table is illustrated determinative for this connection. In this table, the symbols have the following significance:

O = absence of the signal
L = presence of the signal

For the inlet valves indicated in the illustrated example, O means an opened inlet valve and L a closed inlet valve. For any outlet valves (not shown), which might be present, O would represent the closed outlet valve and L the opened outlet valve. Thus, the first row line of the logic table of FIG. 2 has a symbol O for each of the columns $v_{11}$, $b_{11}$, $s_{11}$ and $E_1$ representing an absence of a signal for the deceleration $v_{11}$, the acceleration $b_{11}$, and the slippage $s_{11}$ with the result that the inlet valve $E_1$ is open. However, as shown in the second row line, the presence of a signal L, representing the slippage $s_{11}$ with no signals, O, being present for $v_{11}$ and $b_{11}$ results in the inlet valve $E_1$ being closed, L. It can thus be seen that the inlet valve is opened or closed in accordance with the presence or absence of signals representative of $v_{11}$, $b_{11}$ and $s_{11}$ as indicated in the logic table.

It follows from the logic table according to FIG. 2 for the aimed-at control operation to be described more fully hereinafter by reference to FIG. 3 that, for example, the presence of deceleration or slippage must energize the inlet valve. On the other hand, the presence of the acceleration eliminates the influence of the deceleration and of the slippage.

The circuit itself is constituted of conventional logical elements which fulfill the functions of the logic table. In the instant case, a NOR-element $NOR_1$ to $NOR_4$ with three inputs and a NOR-element $NOR_{12}$ to $NOR_{42}$ with two inputs each are provided in the instant case. The differential amplifiers $DV_{11}$, $DV_{12}$ and $DV_{13}$ are thereby connected with the three inputs of the NOR-element $NOR_1$ whose output is connected with one input of the NOR-element $NOR_{12}$. Additionally, a connection leads from the differential amplifier $DV_{13}$ to the second input of the NOR-element $NOR_{12}$.

The operating sequence of such a control is illustrated in FIG. 3. This figure thereby contains three diagrams, and more particularly FIG. 3a represents the aimed-at rotational speed curve of the wheel as well as the control conditions of the valves;

FIG. 3b represents the associated curve of the acceleration with indicated control thresholds; and FIG. 3c illustrates the associated curve of the slippage, also with indicated control thresholds.

If one considers now the progress of a wheel which has a tendency to lock, then one sees from FIG. 3a the intended curve of the braking, as well as the maximum rotational speed and the slippage thresholds. FIG. 3b shows the curve of the acceleration and FIG. 3c the curve of the slippage. In the last two diagrams 3b and 3c, the response thresholds of the valves are indicated as lines parallel to the time axis. If the wheel is braked, then at first according to diagram 3b the deceleration $v$ increases and exceeds in point $P_1$ the threshold of the inlet valve so that the latter closes. A further pressure build-up in the brake circuit is thus prevented. Nevertheless, the wheel continues to decelerate so that the deceleration further increases and exceeds or surpasses in the point $P_2$ the response threshold of the outlet valve. The latter is now also controlled and opens, i.e., the pressure in the brake circuit is decreased. In the meantime, also the slippage has exceeded the response threshold of the valves, however, this remains without influence since the valves have already been controlled.

After the opening of the outlet valve, the wheel is again accelerated by the road, i.e., its rotational speed again increases. A rotary acceleration thereby occurs at the wheel, and according to FIG. 3b this rotational speed acceleration $b$ now exceeds in the point $P_3$ the response threshold of the output valve, i.e., the latter is closed again. A further pressure decrease in the wheel brake is prevented thereby. The wheel naturally continues to accelerate so that in the point $P_4$ also the response threshold of the inlet valve is exceeded so that the latter opens. As a result thereof pressure is again built up in the brake circuit and the braking starts again. The wheel is now again braked and the wheel acceleration again passes over into a wheel deceleration. Consequently, the response threshold of the inlet valve is again passed in the point $P_5$, i.e., the latter closes and the pressure remains constant for such length of time until, according to FIG. 3c the slippage in the point $P_6$ drops below the response threshold $S_{11}$ of the inlet valve and opens the same again.

The subsequent control cycle takes place in principle exactly as the first. It can be seen from these two first control cycles that the associated slippage thresholds are reached always later in time than the acceleration thresholds so that the slippage has an influence during this phase only during the re-opening of the inlet valve. If, however, one considers now the third control cycle, then one determines that during the re-acceleration according to FIG. 3b the response thresholds of the valves are not reached at all by the acceleration. This means the brake is not released again for operation by the acceleration signals. The wheel therefore continues to accelerate as before and the slippage decreases. Consequently, according to FIG. 3c the slippage value surpasses in the points A and B the response thresholds of the two valves and will therefore assume the control. The brakes are therefore ready again for further control cycles.

A safety installation is coordinated to the brake force control system. It has the task to supervise and monitor the functioning and proper operation of the control. In case of a disturbance—also of the safety installation itself—the control is to be disconnected in such a manner that the vehicle brakes are ready to function in their normal manner.

This safety installation is constructed as an electrical logic circuit. The control signals of the valves which, in the embodiment according to FIG. 1, are present at the points $K_1$ to $K_4$ (or analogously those also of the non-illustrated outlet valves), may be utilized for the supervising of the installation. If all sensing devices and the control apparatus are in order, then none of the points $K_1$ to $K_4$ carries a potential. If a control takes place during a braked drive, then the valves are controlled. Corresponding to the frequency of the control cycles, this control is of short duration. If a continuous potential is present at any one of the points $K_1$ to $K_4$, then this indicates an error or failure in the installation. This criterion is utilized by the safety logic circuit for disconnecting the installation, for example, for turning off the current supplied to the magnetic valves.

A disconnection of the installation after the beginning of a braking operation can lead to critical driving conditions. Consequently, a monitoring and supervision is necessary already during the unbraked drive. Since the installation operates independently of the actuation of the brakes, a continuous monitoring and supervision can be carried out according to the principle described above.

It can be prevented by suitable measures that the safety installation also responds to an excessive drive slippage of one or several driving wheels. For example, the simultaneous presence of a potential at the valves of the non-driven wheels with non-actuated brake may be utilized as logical decision.

A further monitoring possibility resides in that the control device is continuously acted upon with a test program with non-actuated brakes.

The test program simulates alternately for the individual wheels a rotational speed change and utilizes the response of the control system, for example, the potentials at $K_1$ to $K_4$.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A brake control system for the brakes of vehicles in which a sensing means coordinated to each wheel for determining its rotational condition influences the brakes when a predetermined threshold value is exceeded or dropped below, each sensing means includes means responsive to the speed of the wheel for providing measuring magnitudes in the form of first, second and third signals representing wheel slippage, acceleration and deceleration, respectively, said means responsive to the speed of the wheel providing the first signal magnitude representing wheel slippage by a comparison with a comparison standard representing the speed of the fastest wheel, threshold circuit means for each of these signals for providing an output signal indicative of whether the threshold value has been exceeded or not, and means for combining the output signals of said threshold circuit means to provide an output signal which serves as a control signal for the brakes.

2. A brake force control system according to claim 1, characterized in that the measuring magnitude which is proportional to the rotational speed and is derived from the corresponding sensing means, serves, on the one hand, for the formation of the measuring magnitude representing the slippage and, on the other, for the formation of the measuring magnitude representing the acceleration by differentiation.

3. A brake force control system according to claim 2, characterized by comparison means operatively connected to said sensing means for producing the measuring magnitude representing the slippage and differentiating means operatively connected with the corresponding sensing means for forming the measuring magnitude representing the acceleration.

4. A brake force control system according to claim 2, characterized in that a frequency generator means is drivingly connected with each wheel as sensing means.

5. A brake force control system according to claim 4, characterized in that the frequency generator means is arranged at a respective wheel.

6. A brake force control system according to claim 4, characterized in that a frequency voltage converter means is operatively connected with each frequency generator means, the outputs from said frequency voltage converter means being connected together by way of diodes to a point for forming the maximum voltage representing the speed of the fastest wheel, while the outputs of said frequency voltage converter means are also operatively connected with differentiator means in by-passing relationship to the maximum voltage point.

7. A brake force control system according to claim 6, characterized in that the maximum voltage prevailing at the maximum voltage point is subdivided at the ratio of the desired response condition by resistance means and a partial voltage is fed to a differential amplifier means constructed as threshold circuit means.

8. A brake force control system according to claim 7, characterized in that each differentiator means is connected with its output to two parallel frequency weighting means which, in their turn, are each operatively connected with a respective differential amplifier means constructed as threshold circuit means.

9. A brake force control system according to claim 8, characterized in that the frequency weighting means for deceleration and acceleration are different.

10. A brake force control system according to claim 9, characterized in that one threshold circuit means each for slippage, for acceleration and for deceleration is operatively associated with each adjusting valve means present in a respective brake circuit, the output signals of the three threshold circuit means being interconnected by combining means in the form of a logic circuit means according to a predetermined logic arrangement.

11. A brake force control system according to claim 10, characterized in that the threshold circuit means are differential amplifier means for the slippage, for the acceleration and for the deceleration.

12. A brake force control system according to claim 10, characterized in that the logic circuit means includes integrated circuits with a NOR-element having three inputs and a NOR-element having two inputs for each valve adjusting means.

13. A brake force control system according to claim 12, characterized in that the output of each threshold circuit means is connected with one input of the NOR-element having three inputs whose output is connected with one input of the NOR-element having two inputs while the second input of the NOR-element having two inputs is operatively connected with the differential amplifier means of the threshold circuit means representing the acceleration.

14. A brake force control system according to claim 13, characterized by a safety installation for continuously monitoring and supervising the control system which prevents a transmission of signals to the adjusting valve means in case of erroneous signals.

15. A brake force control system according to claim 14, characterized in that the adjusting valve means for the valves of the brakes are so actuated in case of erroneous signals that the brakes operate in the normal manner.

16. A brake force control system according to claim 15, characterized in that the safety installation includes an electric logic circuit means operatively connected between an output transistor and its corresponding adjusting valve means which de-energizes the adjusting valve means in case of response of its circuit.

17. A brake force control system according to claim 16, characterized in that the adjusting valve means are solenoid valves which are de-energized.

18. A brake force control system according to claim 16, characterized in that test program means are provided for applying signals to the control system with non-actuated brakes for producing output control signals by the simulated rotational speed changes thereof which are continuously monitored by the safety installation.

19. A brake force control system according to claim 1, characterized in that a frequency generator means is drivingly connected with each wheel as sensing means.

20. A brake force control system according to claim 19, characterized in that the frequency generator means is arranged at a respective wheel.

21. A brake force control system according to claim 19, characterized in that a frequency voltage converter means is operatively connected with each frequency generator means, the outputs from said frequency voltage converter means being connected together by way of diodes to a point for forming the maximum voltage representing the speed of the fastest wheel, while the outputs of said frequency voltage converter means are also operatively connected with differentiator means in by-passing relationship to the maximum voltage point.

22. A brake force control system according to claim 21, characterized in that the maximum voltage prevailing at the maximum voltage point is subdivided at the ratio of the desired response condition by resistance means and a partial voltage is fed to a differential amplifier means constructed as threshold circuit means.

23. A brake force control system according to claim 22, characterized in that each differentiator means is connected with its output to two parallel frequency weighting means which, in their turn, are each operatively connected with a respective differential amplifier means constructed as threshold circuit means.

24. A brake force control system according to claim 23, characterized in that the frequency weighting means for deceleration and acceleration are different.

25. A brake force control system according to claim 1, characterized in that one threshold circuit means each for slippage, for acceleration and for deceleration is separately operatively associated with each adjusting valve means present in a respective brake circuit, the output signals of the three threshold circuit means being interconnected by combining means in the form of a logic circuit means according to a predetermined logic arrangement.

26. A brake force control system according to claim 25, characterized in that the threshold circuit means are differential amplifier means for the slippage, for the acceleration and for the deceleration.

27. A brake force control system according to claim 25, characterized in that the logic circuit means includes integrated circuits with a NOR-element having three inputs and a NOR-element having two inputs for each adjusting means.

28. A brake force control system according to claim 27, characterized in that the output of each threshold circuit means is connected with one input of the NOR-element having three inputs whose output is connected with one input of the NOR-element having two inputs while the second input of the NOR-element having two inputs is operatively connected with the differential amplifier means of the threshold circuit means representing the acceleration.

29. A brake force control system according to claim 1, characterized by a safety installation for continuously monitoring and supervising the control system which prevents a transmission of signals to an adjusting valve means in case of erroneous signals.

30. A brake force control system according to claim 27, characterized in that the adjusting valve means for the valves of the brakes are so actuated in case of erroneous signals that the brakes operate in the normal manner.

31. A brake force control system according to claim 29, characterized in that the safety installation includes an electric logic circuit means operatively connected between an output transistor and its corresponding adjusting valve means which de-energizes the adjusting means in case of response of its circuit.

32. A brake force control system according to claim 31, characterized in that test program means are provided for applying signals to the control system with non-actuated brakes for producing output control signals by the simulated rotational speed changes thereof which are continuously monitored by the safety installation.

* * * * *